United States Patent
Kroeber et al.

(10) Patent No.: US 10,821,815 B2
(45) Date of Patent: Nov. 3, 2020

(54) WIND GUIDING DEVICE FOR AN OPEN-TOP PASSENGER VEHICLE

(71) Applicant: Daimler AG, Stuttgart (DE)

(72) Inventors: Stefan Kroeber, Tuebingen (DE); Nicolai Melchger, Wildberg (DE); Alexander Moessner, Rutesheim (DE); Stephan Reinberg, Sindelfingen (DE); Hironori Tokuno, Holzgerlingen (DE); Joachim Wenzler, Simmozheim (DE)

(73) Assignee: Daimler AG, Stuttgart (DE)

( * ) Notice: Subject to any disclaimer, the term of this patent is extended or adjusted under 35 U.S.C. 154(b) by 106 days.

(21) Appl. No.: 15/546,523

(22) PCT Filed: Jan. 15, 2016

(86) PCT No.: PCT/EP2016/000069
§ 371 (c)(1),
(2) Date: Jul. 26, 2017

(87) PCT Pub. No.: WO2016/119998
PCT Pub. Date: Aug. 4, 2016

(65) Prior Publication Data
US 2018/0001753 A1    Jan. 4, 2018

(30) Foreign Application Priority Data

Jan. 27, 2015  (DE) .................. 10 2015 000 964
Sep. 5, 2015  (DE) .................. 10 2015 011 794

(51) Int. Cl.
*B60J 7/22*        (2006.01)

(52) U.S. Cl.
CPC .................................. *B60J 7/223* (2013.01)

(58) Field of Classification Search
CPC ....................................................... B60J 7/223
(Continued)

(56) References Cited

U.S. PATENT DOCUMENTS

| 8,424,957 B2 * | 4/2013 | Dittrich | B60J 7/22 |
| | | | 296/180.5 |
| 8,944,491 B2 * | 2/2015 | Neumann | B60J 7/22 |
| | | | 296/180.5 |

(Continued)

FOREIGN PATENT DOCUMENTS

| DE | 196 03 670 C1 | 4/1997 |
| DE | 199 58 748 A1 | 6/2001 |

(Continued)

OTHER PUBLICATIONS

PCT/EP2016/000069, International Search Report dated Apr. 22, 2016 (Three (3) pages).

(Continued)

*Primary Examiner* — D Glenn Dayoan
*Assistant Examiner* — Dana D Ivey
(74) *Attorney, Agent, or Firm* — Crowell & Moring LLP

(57) ABSTRACT

A wind guiding device for an open-top passenger vehicle is disclosed. The wind guiding device has an inherently stiff, slat-shaped wind guiding element that can be adjusted between a retracted position and at least one wind guiding position relative to a windscreen frame. Several disruptive bodies are arranged on the underside of the wind guiding element.

8 Claims, 4 Drawing Sheets

(58) Field of Classification Search
USPC .................................................. 296/180.1
See application file for complete search history.

(56) References Cited

U.S. PATENT DOCUMENTS

| 2001/0017479 | A1 | 8/2001 | Birndorfer et al. |
| 2008/0246306 | A1 | 10/2008 | Oerke et al. |
| 2010/0164254 | A1* | 7/2010 | Fidan .................. B60J 7/22 296/217 |

FOREIGN PATENT DOCUMENTS

| DE | 101 17 364 A1 | 10/2001 |
| DE | 10 2006 023 911 A1 | 11/2007 |
| DE | 10 2010 002 908 A1 | 9/2011 |
| EP | 1 281 556 A1 | 2/2003 |
| JP | 9-2339 A | 7/1997 |
| JP | 2006-347475 A | 12/2006 |
| JP | 2009-515748 A | 4/2009 |

OTHER PUBLICATIONS

Japanese Office Action issued in Japanese counterpart application No. 2017-539440 dated Apr. 24, 2018, with partial English translation (Eight (8) pages).

* cited by examiner

WIND GUIDING DEVICE FOR AN OPEN-TOP PASSENGER VEHICLE

BACKGROUND AND SUMMARY OF THE INVENTION

The invention relates to a wind guiding device for a passenger vehicle.

Such a wind guiding device is already known, for example, from the Mercedes Benz E-Class Cabriolet (Series A207) or from DE 10 2006 023 911 A1. The wind guiding device here comprises an inherently stiff wind guiding element that can be adjusted between a retracted position and at least one wind guiding position relative to a windscreen frame and that can be adjusted in the vertical direction of the vehicle relative to the windscreen frame.

The windscreen frame borders a screen opening for a windscreen, wherein the inherently stiff wind guiding element in the wind guiding position serves to guide airflow that flows over the windscreen during open-top driving of the passenger motor vehicle over the internal space, to even it out and, in doing so, avoid excessive drafts that arise, for example, as a result of a horizontal wind cylinder that forms behind the internal space. As a result of the wind guiding element, not only unpleasant drafts but also turbulences and wind noise associated therewith can be reduced in order to thus achieve a particularly high level of driving comfort when the passenger vehicle is driving with an open top.

The object of the present invention is to create a wind guiding device of the type cited above by means of which a particularly high level of driving comfort can be achieved.

In order to create a wind guiding device of the type cited above by means of which a particularly high level of driving comfort can be achieved, in particular when the passenger vehicle is driving with an open top, it is provided that a plurality of disruptive bodies are arranged on the slat-shaped wind guiding element, the disruptive bodies being provided on the underside, in particular the lower flat side of the wind guiding element. Here, air, i.e., the airflow produced when driving, can flow around the disruptive bodies at least in the at least one wind guiding position of the wind guiding element when the passenger vehicle is traveling in a forwards direction and the disruptive bodies advantageously influence the air or the flow thereof in such a way that the emergence of excessive air turbulences and wind and air separation sounds, which can be perceived by the occupants sitting in the passenger space of the motor vehicle, can be avoided. Thus, in particular when the passenger vehicle is traveling with an open top, a particularly high level of driving comfort can be achieved as a result of the wind guiding device according to the invention.

In a particularly advantageous exemplary embodiment of the wind guiding device, it is provided that the disruptive bodies are formed and arranged in such a way that, in the driving operation of the motor vehicle and when the wind guiding element is arranged in the wind guiding position, a non-coherent separation of the air stream can be achieved on the back peripheral edge of the wind guiding element over at least one substantial part of the longitudinal extension of the wind guiding element. It is thus achieved by means of the disruptive bodies that the air stream that is separated on the back peripheral edge of the slat-shaped wind guiding element and that leads to revolving or rotating air cylinders in the forwards traveling direction of the motor vehicle is influenced in such a way that it results not only in an equal air cylinder formation extending substantially across the entire length of the back peripheral edge over the longitudinal extension of the wind guiding element, but that, over the length of the peripheral edge, temporal differences between the air cylinders separated by the lower peripheral edge emerge. These air cylinders cause an uncorrelated broadband noise such that, overall, a more pleasant noise level for the occupants arises.

In a preferred embodiment of the wind guiding device, it is provided that the disruptive bodies are arranged in the region of the back peripheral edge of the wind guiding element—seen in the installed state of the wind guiding device in the motor vehicle and when the motor vehicle is traveling in a forwards direction—or extend up to or close to the back peripheral edge. Because of this arrangement of the disruptive bodies, these cannot be seen in a top view on the upper side of the wind guiding element. Rather, these form a defined disruption/unevenness structure on the underside of the wind guiding element such that the defined uneven underside topography of the wind guiding element achieved in such a way causes the desired separation of the air stream on the back peripheral edge of the wind guiding element.

In principle, it is possible to form the disruptive bodies as one piece with the wind guiding element which can simplify the production of the wind guiding element in certain embodiments thereof. In a different exemplary embodiment of the wind guiding element, it is provided that the disruptive bodies are provided, in particular are formed, on a slat-shaped surface element, preferably a surface element having at least a certain inherent stiffness which is fixed on the region of the wind guiding element near the back peripheral edge on the underside of the wind guiding element in the region thereof. The longitudinal extension of the surface element can be the same as that of the wind guiding element or, on the other hand, it can be smaller. In this embodiment, it is particularly advantageous that the surface element having the disruptive bodies can be produced from a different material to the slat-shaped wind guiding element.

The shape and arrangement and the number of the disruptive bodies according to the invention for the respective wind guiding element are, in principle, variable and, in each case, is dependent on the stream of the wind guiding element during driving operation, which, in turn, largely depends on the respective chassis shape of the motor vehicle, the incline of the windscreen etc.

In order to achieve the desired air stream influence or separation on the back peripheral edge of the wind guiding element over at least sections of the longitudinal extension thereof, the disruptive bodies can be formed in the shape of nubs or strip-shaped elements or similar. It is also possible that not all the disruptive bodies have the same shape, size and spacing.

With elongated disruptive bodies and in particular those formed to be strip-shaped, these can have the most different formations or shapes on the side of the external periphery. For example, the disruptive bodies can have an angular, preferably polygonal, in particular triangular or quadrilateral external shape. It is also possible that at least one part of the disruptive bodies is formed on the peripheral side to be edge-free, in particular formed to be curved.

In an advantageous exemplary embodiment of the wind guiding device it is provided that at least one part of the disruptive bodies has a cross-section that varies over the longitudinal extension thereof. Preferably, the respective disruptive bodies have a longitudinal extension direction which, in particular, does not at least substantially run in parallel to the longitudinal extension direction of the wind guiding element. In the installation position of the wind guiding device, the longitudinal extension direction of the wind guiding element preferably coincides with the transverse direction of the vehicle, wherein the wind guiding device adopts its installation position in the completely produced state of the open passenger vehicle. By means of the elongated disruptive bodies, energy is introduced into the air or the flow by sufficiently influencing and thus swirling the air such that resulting turbulences on a back edge of the wind guiding element in the longitudinal direction of the vehicle are sufficient in order to prevent unwanted noises. Thus, excessive wind noises, especially howling and whistling sounds, when the wind guiding element is extended, i.e., when the wind guiding element is in its wind guiding position, can be avoided. As a result, howling and whistling sounds on the back edges of sliding roof covers can be avoided or at least kept to a minimum. Of course, it is also possible that the disruptive bodies are provided with a constant cross-section across their longitudinal extension.

Further advantages, features and details of the invention arise from the description of a preferred exemplary embodiment below, as well as with the aid of the drawings.

DETAILED DESCRIPTION OF THE DRAWINGS

Figure 1:
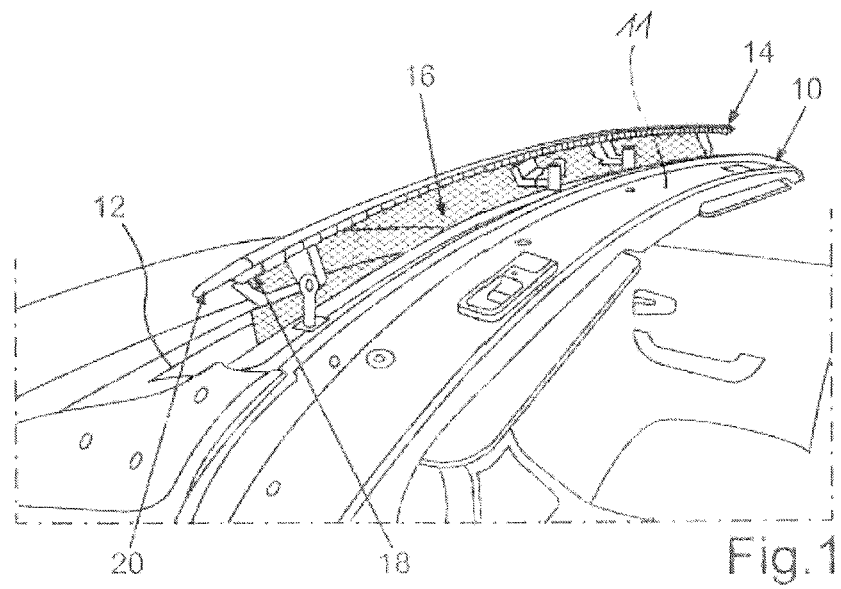
FIG. 1 is a schematic perspective view of a wind guiding device according to a first embodiment for an open-top passenger vehicle, having an inherently stiff wind guiding element that can be adjusted between a retracted position in at least one wind guiding position relative to a windscreen frame, wherein a plurality of disruptive bodies is arranged on the wind guiding element, the disruptive bodies being formed on the external peripheral side to be triangular.

In the figures, the same or functionally identical elements are provided with the same reference numerals.

FIG. 1 shows a wind guiding element according to a first embodiment for an open passenger vehicle in a schematic perspective view. The open passenger vehicle is formed, for example, as a cabriolet with a cover in the form of a fabric cover. The following embodiments, however, can also be easily transferred to other open passenger vehicles such as roadsters, for example, wherein such a roadster comprises a cover with inherently stiff covering elements, for example, i.e., a so-called folding roof, or even to hard-top motor vehicles with a sliding or sliding rising roof, for example, wherein such a vehicle has a roof opening that can be opened or closed by means of at least one covering element and that can be provided with a wind guiding device according to the invention in the region of its front transverse edge.

The cover of the open passenger vehicle can be mounted between at least one open position and a closed position relative to the chassis of the passenger vehicle, wherein the interior space of the passenger vehicle is covered above by the cover in the closed position in the vertical direction of the vehicle.

The passenger vehicle or the chassis thereof comprises an upper windscreen cross-member 11 that can be seen particularly well in FIG. 1, the cross-member being part of a windscreen frame 10 by means of which a screen opening is limited above in the vertical direction of the vehicle. A windscreen 12 of the passenger vehicle is inserted into the screen opening. When the passenger vehicle is traveling in a forwards direction, air, i.e., airflow produced when driving, streams onto the windscreen 12, wherein the windscreen guides the air or the airflow produced when driving upwards. In order to now guide the air stream over the interior space when the passenger vehicle is traveling with an open cover, to even it out and to thus avoid excessive drafts that can emerge, for example, as a result of a horizontal wind cylinder that forms behind the interior space and, where appropriate, can also be noticeably perceived by the occupants, or to at least attenuate the effects thereof, the wind guiding device according to the invention is provided which is arranged in the region of the windscreen cross-member 11.

Figure 2:
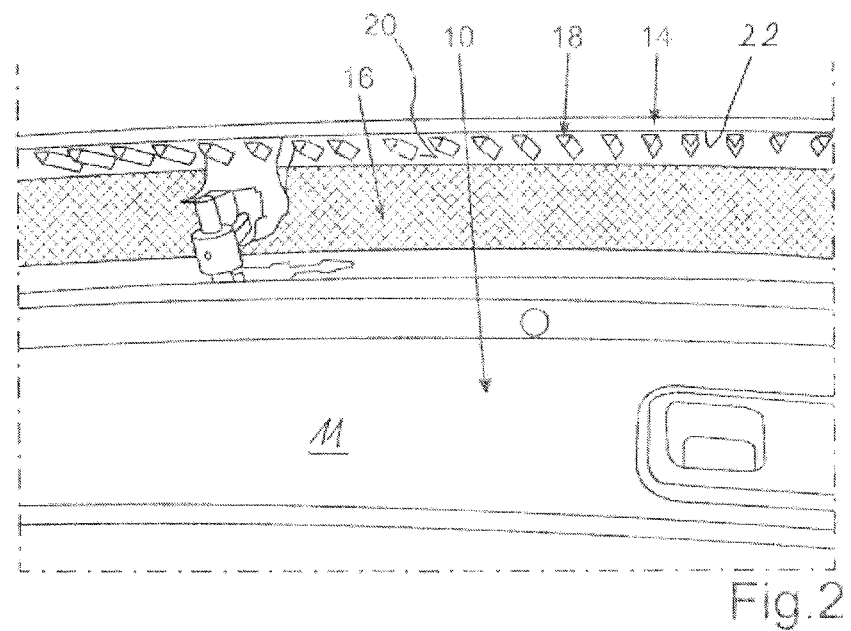
FIG. 2 shows sectionally, a schematic back view of the wind guiding device according to FIG. 1 with a viewing direction somewhat in the forwards traveling direction of the motor vehicle.
Figure 3:
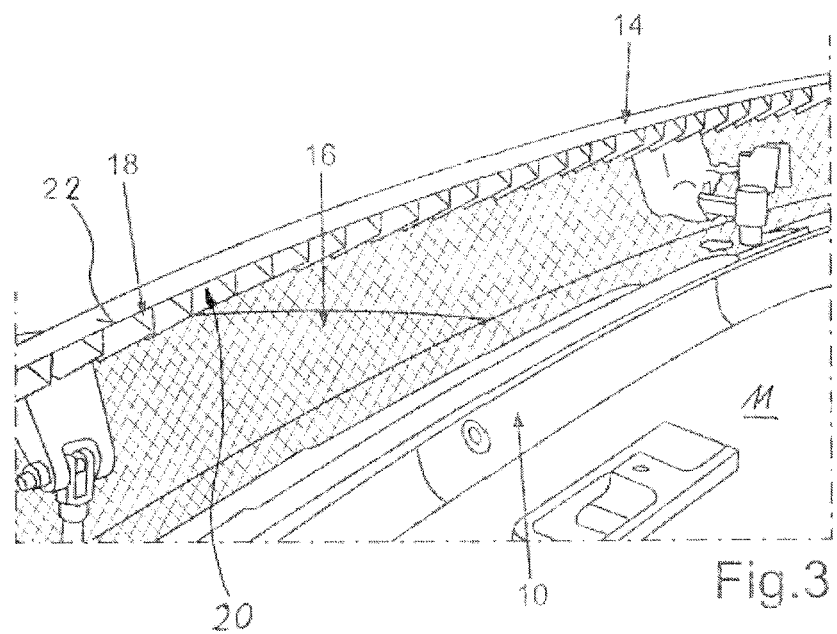
FIG. 3 shows sectionally, a further schematic and perspective back view of the wind guiding device according to FIGS. 1 and 2.

As can be seen particularly well when viewing FIGS. 2 and 3 together, the wind guiding device comprises an inherently stiff, i.e., dimensionally stable, wind guiding element 14 which is also called a slat or a wing and extends at least substantially in the transverse direction of the vehicle. The wind guiding element 14 here has a longitudinal extension direction which runs at least substantially in the transverse direction of the vehicle.

The wind guiding element 14 can be moved between a retracted position, in particular a non-usage position, next to the windscreen frame 10 and at least one wind guiding position (usage position) in the vertical direction of the vehicle relative to the windscreen frame 10. This means that the wind guiding element 14 can be shifted upwardly out of the retracted position next to the windscreen frame 10 into the at least one wind guiding position in the vertical direction of the vehicle relative to the windscreen frame 10 or the upper windscreen cross-member 11. In the exemplary embodiment depicted in FIGS. 1 to 3, the slat-shaped wind guiding element 14 is arranged to be at an angle to an imaginary horizontal and, in particular, to the windscreen cross-member 11 depicted.

Furthermore, the wind guiding element comprises a flexible, i.e., variably shaped, surface element 16 which is formed, for example, as a net or of a net material and, as a result, has through-flow opening through which air can flow. The flexible surface element 16 is connected to the wind guiding element 14 and, as a result, can be moved or shifted with the wind guiding element 14 between the retracted position of the at least one wind guiding position, wherein the at least one wind guiding position is shown in FIGS. 1 to 3.

As a result, it can be seen in FIGS. 1 to 3 that, in the at least one wind guiding position, the surface element 16 is stretched between the wind guiding element 14 and the inherently stiff windscreen frame 10. The inherently stiff wind guiding element 14 and the flexible surface element 16 serve to guide the air streaming across the windscreen 12 over the interior space when the passenger vehicle is driving with an open top, to even it out and thus to avoid excessive drafts and to keep turbulences and resulting wind noises at least to a minimum. More specifically, the airflow is raised by means of the slat-shaped wind guiding element 14 that is arranged in the usage position, while at the same time, the pressure level in the interior space of the vehicle is increased in a controlled manner by means of the net 16.

Mode of operation of the wind guiding element 14 and the surface element 16: in the driving operation of the motor vehicle, when the wind guiding element is raised in the usage position, the air stream guided over the windscreen and from there over the front edge of the roof is partially deflected upwards by means of the slat-shaped wind guiding element 14, flows towards the back over the wind guiding element 14 and breaks off at a back peripheral edge of the wind guiding element 14. A different part of the incoming air stream is deflected downwards and flows downwards through the flexible surface element 16 and subsequently along the free space between the wind guiding element 14 and the windscreen frame 10 over the wind guiding element 14 and also breaks off at a back peripheral edge of the wind guiding element 14. This separated second partial air stream forms an air layer between the faster first partial air stream above and the air mass below in the passenger space.

In order to now further improve the already high level of driving comfort, in particular when the passenger vehicle is driving with an open top, a plurality of disruptive bodies 18 are arranged on the wind guiding element 14 which are formed on the side of the outer periphery to be triangular in the exemplary embodiment according to FIGS. 1 to 3. The inherently stiff disruptive bodies 18 can be seen particularly well in FIGS. 2 and 3. Here, the disruptive bodies 18 are arranged one after the other in the longitudinal extension direction of the wind guiding element 14, i.e., in the transverse direction of the vehicle, and are spaced apart from one another, wherein in the exemplary embodiment of the wind guiding device depicted here, the disruptive bodies 18 are spaced apart from one another evenly and in pairs. This means that respective distances between the disruptive bodies 18 are the same in pairs. However, it is also possible in principle that the disruptive bodies 18 can have different, i.e., irregular, distances relative to one another. Furthermore, the disruptive bodies have a longitudinal extension direction which runs at an angle or, presently, perpendicular to the longitudinal extension direction of the wind guiding element 14 and here are formed with a triangular cross-section. The disruptive bodies 18 are thus triangular, elongated disruptive bodies which extend at least across the predominant width of the wind guiding element 14 that extends in the longitudinal direction of the vehicle. This means that the disruptive bodies 18 extend across more than half the width of the wind guiding element 14 running in the longitudinal direction of the vehicle.

It can be seen particularly well in FIGS. 2 and 3 that the disruptive bodies 18 are arranged on an underside 20 of the wind guiding element 14 that is at least facing towards the windscreen frame 10 at least in the at least one wind guiding position and thus pointing downwards in the vertical direction of the vehicle. The disruptive bodies 18 provided on the underside 20 of the wind guiding element 14 end practically on or flush with a back peripheral edge 22 of the wind guiding element 14 on which the airflow or the partial air stream flowing between the wind guiding element 14 and the windscreen frame 10 breaks off from the wind guiding element 14.

In the exemplary embodiment according to FIGS. 1 to 3, the peripheral edge 22 is formed to be relatively sharp edged, however—depending on the formation of the wind guiding element 14—can also easily have a certain curvature as is described subsequently in more detail by means of the embodiments of the wind guiding element 14 depicted in FIGS. 4 to 7.

It has been shown that air that is guided away by the windscreen 12 can flow around the disruptive bodies 18 at least in the at least one wind guiding position when the passenger vehicle is traveling forwards; the disruptive bodies 18 advantageously influence the air or the flow thereof in such a way that excessive wind noises and air turbulences can be avoided. As a result, a particularly high level of driving comfort can be achieved for people present in the interior space when the vehicle is traveling with an open top.

It can be provided that the disruptive bodies 18 are formed as one piece with the wind guiding element 14. Alternatively, it is conceivable that the disruptive bodies 18 are formed as components that are formed separately from the wind guiding element 14 and fixed on the wind guiding element 14.

Furthermore, it is preferably provided that the disruptive bodies 18 are arranged to be distributed at least across the predominant length of the wind guiding element 14 running in the transverse direction of the vehicle in order to thus achieve a particularly advantageous influence of the air flowing around the disruptive bodies 18 or the wind guiding element 14.

Figure 4:
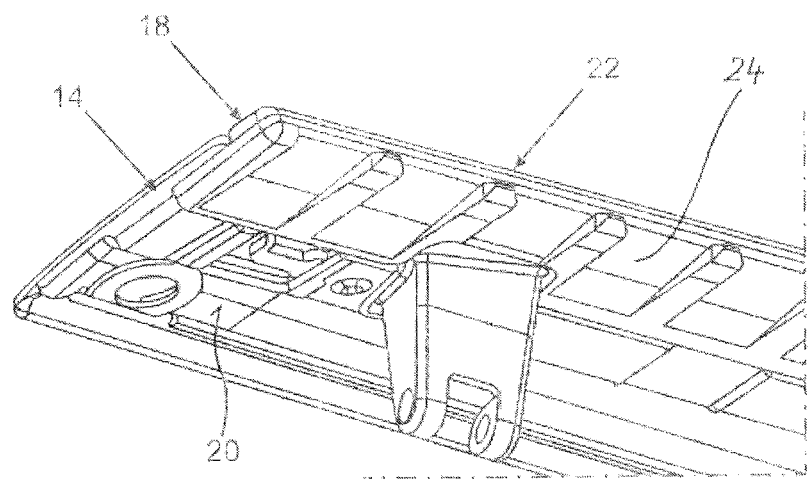
FIG. 4 shows sectionally, a schematic and perspective bottom view of the wind guiding element according to a second embodiment.

In a schematic and perspective bottom view, FIG. 4 shows the wind guiding element 14 according to a second embodiment which thus differs from the first embodiment, in particular, in that the disruptive bodies 18 are not formed on the side of the external periphery or to be somewhat triangular in cross-section, but rather are formed to be at least substantially wedge-shaped in the longitudinal extension direction or in the style of a wedge and thus have a triangular shape only in their side view or in their longitudinal sectional view. As a result, the disruptive bodies 18 have a cross-section that varies in the longitudinal extension direction. The respective gap or channel arranged laterally between two disruptive bodies 18 arranged adjacently and bordered above by the underside 20 of the wind guiding element 14 has a free cross-section that becomes larger in the direction of the back peripheral edge 22.

Also in the second embodiment, the disruptive bodies 18 are arranged on the underside 20 and are spaced apart downwardly from the underside 20 or the wind guiding element 14 at least substantially in the longitudinal direction of the vehicle. As in the first embodiment, the respective disruptive bodies 18 run with their longitudinal extension direction at least substantially perpendicular to the longitudinal extension direction of the wind guiding element 14.

In the installed position of the wind guiding device, the longitudinal extension direction of the wind guiding element 14 coincides at least substantially with the transverse direction of the vehicle. In terms of the wind guiding position, the long or elongated disruptive bodies 18 extend at least substantially in the longitudinal direction of the vehicle from front to back, wherein their extension running in the vertical direction of the vehicle, i.e., their thickness running in the vertical direction of the vehicle, increases from the front to the back in the longitudinal direction of the vehicle. This means that the disruptive bodies 18 are spaced below on a back edge 22 of the wind guiding element 14 in the longitudinal direction of the vehicle further from the underside 20 than in a region which is arranged in front of the back edge 22 in the longitudinal direction of the vehicle. The edge 22 is thus a back/peripheral edge of the wind guiding element 14 that points downwards in the installation position of the wind guiding element in the longitudinal direction of the vehicle.

Air which flows around the wind guiding element 14 and the disruptive bodies 18, for example, when the passenger vehicle is traveling forwards with an open top and in the wind guiding position of the wind guiding element 14, is influenced by means of the disruptive bodies 18 in such a way that the air or its flow is swirled. As a result, turbulences of air, in particular on the back edge (edge 22) arise, wherein this turbulence is sufficient to prevent the excessive and unwanted noises. As a result, wind noises, especially howling and whistling sounds can be avoided or at least kept to a minimum when the wind guiding element 14 is extended.

Furthermore, it is provided in the second embodiment that the disruptive bodies 18, which are formed, for example, from a plastic, are formed to be one piece with one another. In doing so, the disruptive bodies 18 are formed, for example, by a one-piece strip or a surface element 24 that has the disruptive bodies or is preferably inherently stiff, the surface element 24 being formed on the underside 20 of the wind guiding element 14. This strip here has a longitudinal extension direction which coincides with the longitudinal extension direction of the wind guiding element 14. The individual disruptive bodies 18 are spaced apart from one another in the longitudinal extension direction of the wind guiding element 14 such that, in the longitudinal extension direction of the wind guiding element 14, respective intermediate spaces are arranged between the respective disruptive bodies 18.

Figure 5:
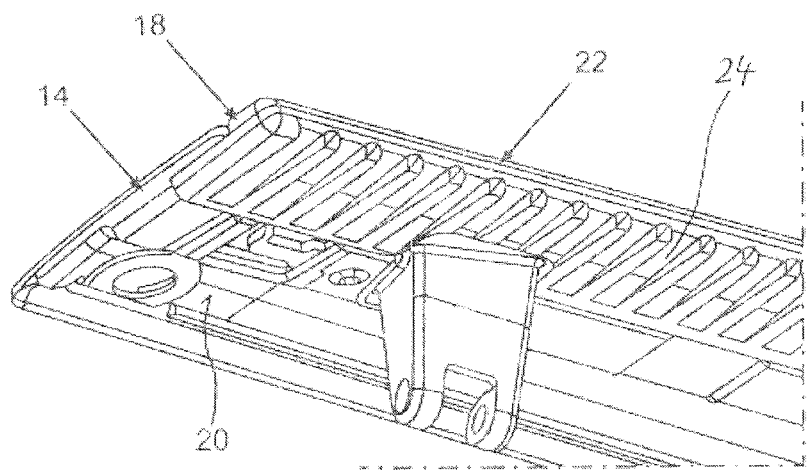
FIG. 5 shows sectionally, a schematic and perspective bottom view of the wind guiding element according to a third embodiment.

FIG. 5 shows the wind guiding element 14 according to a third embodiment. The third embodiment thus differs from the second embodiment, in particular, in that the number of disruptive bodies 18 in the third embodiment is higher than in the second embodiment. For example, it is provided in the second and third embodiment that the disruptive bodies 18 have an at least substantially constant width running in the longitudinal extension direction of the wind guiding element 14, however varying heights. Thus, the disruptive bodies 18 here also have a cross-section that varies in the longitudinal extension direction.

Figure 6:
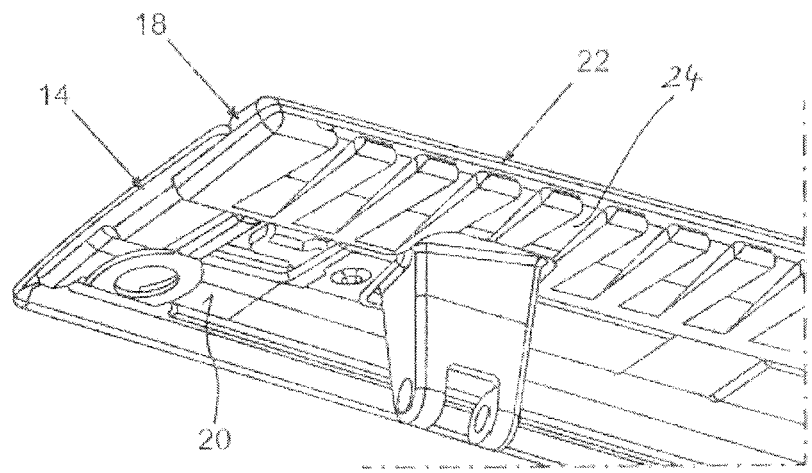
FIG. 6 shows sectionally, a schematic and perspective bottom view of the wind guiding element according to a fourth embodiment.

FIG. 6 shows a fourth embodiment of the wind guiding element 14 having the disruptive bodies 18. The fourth embodiment thus differs, in particular, from the second and third embodiment in that the respective width of the disruptive bodies 18 increases from the front to the back in the longitudinal direction of the vehicle or to the back in the longitudinal extension direction of the disruptive bodies 18.

Figure 7:
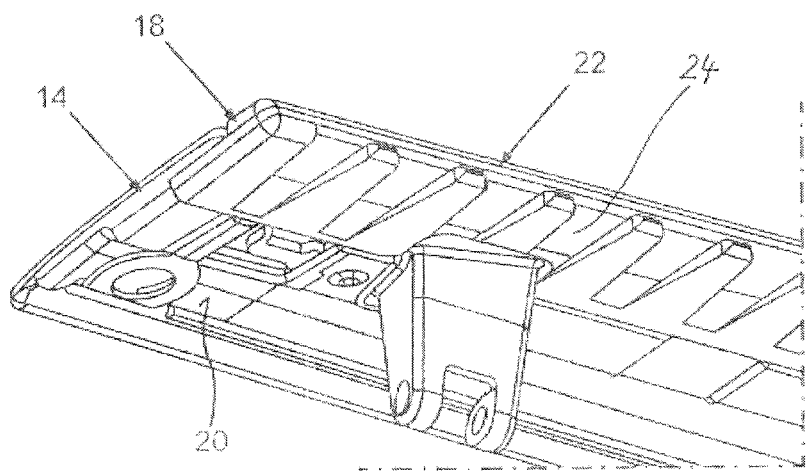
FIG. 7 shows sectionally, a schematic and perspective bottom view of the wind guiding element according to a fifth embodiment.

Finally, FIG. 7 shows a fifth embodiment of the wind guiding element 14 or the disruptive bodies 18. In the fifth embodiment, it is provided that the respective width of the disruptive bodies 18 extending in the longitudinal extension direction of the wind guiding element 14 decreases from the front to the back in the longitudinal direction of the disruptive bodies 18. In doing so, the intermediate spaces between the disruptive bodies 18 in the fifth embodiment are wider in the longitudinal extension direction of the disruptive bodies 18 from front to back, wherein these intermediate spaces are narrower from front to back in the fourth embodiment in the longitudinal extension direction of the disruptive bodies 18. As a whole, it can be seen in the drawings that the disruptive bodies 18 formed, for example, as longitudinal disruptive bodies can vary in number and/or width, wherein their formation can also be flat for constructive reasons.

In particular, underlying the use of the disruptive bodies 18 is the recognition that, on overflow profiles such as covers, for example, and on the back edge, it can result in so-called back edge noise with howling and/or whistling sounds. The causes here are temporally fluctuating speed differences on the upper and lower sides of the profile and coherent separations. By means of the disruptive bodies 18 having a varying cross-section in the longitudinal extension direction, especially at high speed differences, these howling and whistling sounds can be reduced or completely eliminated, since the air or its flow is specifically influenced by means of the disruptive bodies 18 and swirled in particular.

It still remains to be said that the disruptive bodies do not necessarily have to be clearly longer in the x direction (longitudinal direction of the vehicle) than their extension in the y direction (transverse direction of the vehicle) or z direction (vertical direction of the vehicle). This is the case, for example, in conical or truncated cone-shaped disruptive bodies.

The invention claimed is:

1. A wind guiding device for an open-top passenger vehicle, comprising:
    an inherently stiff, slat-shaped wind guiding element that is adjustable between a retracted position and a wind guiding position relative to a windscreen frame; and
    a plurality of disruptive bodies disposed on an underside of the wind guiding element, wherein the plurality of disruptive bodies extend up to a back peripheral edge of the wind guiding element, wherein the plurality of disruptive bodies are distributed across a predominant length of the wind guiding element running in a transverse direction of the passenger vehicle, and wherein the plurality of disruptive bodies are formed as one piece with the wind guiding element, and thus, not as separately formed components that are fixed on the wind guiding element.

2. The wind guiding device according to claim 1, wherein the plurality of disruptive bodies are configured such that, in a driving operation of the passenger vehicle and with the wind guiding element disposed in the wind guiding position, a non-coherent separation of an air stream on the back peripheral edge of the wind guiding element is achieved by a part of a longitudinal extension of the wind guiding element.

3. The wind guiding device according to claim 1, wherein the plurality of disruptive bodies are disposed one after another in a longitudinal extension direction of the wind guiding element and are spaced apart from one another.

4. The wind guiding device according to claim 1, wherein the plurality of disruptive bodies are strip-shaped.

5. The wind guiding device according to claim 1, wherein the plurality of disruptive bodies have a longitudinal extension direction running at an angle to or perpendicular to a longitudinal extension direction of the wind guiding element.

6. The wind guiding device according to claim 1, wherein the plurality of disruptive bodies have a cross-section that varies across a longitudinal extension direction of the plurality of disruptive bodies.

7. The wind guiding device according to claim 1, wherein a flexible surface element is stretched between the wind guiding element and the windscreen frame in the wind guiding position.

8. A motor vehicle comprising a wind guiding device according to claim 1.

* * * * *